(12) United States Patent
Xu et al.

(10) Patent No.: US 9,446,395 B2
(45) Date of Patent: Sep. 20, 2016

(54) LOW TEMPERATURE CATALYST/HYDROCARBON TRAP

(71) Applicant: Ford Global Technologies, LLC, Dearborn, MI (US)

(72) Inventors: Lifeng Xu, Northville, MI (US); Robert Walter McCabe, Novi, MI (US); Jason Aaron Lupescu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/183,785

(22) Filed: Feb. 19, 2014

(65) Prior Publication Data

US 2015/0231566 A1    Aug. 20, 2015

(51) Int. Cl.
| | |
|---|---|
| *B01J 29/00* | (2006.01) |
| *B01J 29/06* | (2006.01) |
| *B01J 21/00* | (2006.01) |
| *B01J 21/04* | (2006.01) |
| *B01J 21/16* | (2006.01) |

(Continued)

(52) U.S. Cl.
CPC .............. *B01J 35/04* (2013.01); *B01D 53/945* (2013.01); *B01D 53/9477* (2013.01); *B01J 23/63* (2013.01); *B01J 29/068* (2013.01); *B01J 29/44* (2013.01); *B01J 29/7415* (2013.01); *B01J 37/0246* (2013.01); *B01D 2255/1023* (2013.01); *B01D 2255/407* (2013.01); *B01D 2255/50* (2013.01); *B01D 2255/908* (2013.01); *B01D 2255/909* (2013.01); *Y02T 10/22* (2013.01)

(58) Field of Classification Search
CPC .......... B01J 23/10; B01J 23/40; B01J 23/58; B01J 23/63; B01J 21/00; B01J 29/0325
USPC ............... 502/66, 74, 80, 304, 328, 330, 502/332–334, 339, 349, 439; 422/171
See application file for complete search history.

(56) References Cited

U.S. PATENT DOCUMENTS

| | | | |
|---|---|---|---|
| 5,888,464 A | 3/1999 | Wu et al. | |
| 6,087,298 A * | 7/2000 | Sung et al. | ............... 502/333 |

(Continued)

FOREIGN PATENT DOCUMENTS

| | | |
|---|---|---|
| EP | 0432534 A1 | 6/1991 |
| EP | 0566878 A1 | 10/1993 |

OTHER PUBLICATIONS

Chun et al., "Reducibility of catalyzed cerium-praseodymium mixed oxides", Catalysis Letters, vol. 106, Nos. 3-4, Feb. 2006.

(Continued)

*Primary Examiner* — Cam N. Nguyen
(74) *Attorney, Agent, or Firm* — Damian Porcari; Alleman Hall McCoy Russell & Tuttle LLP (57) ABSTRACT

A low-temperature catalyst is provided for reducing cold-start hydrocarbon emissions. The catalyst comprises a platinum group metal impregnated onto an oxygen storage material. The catalyst may be used alone or may be included in a hydrocarbon trap containing a hydrocarbon adsorption material therein. The catalyst/hydrocarbon trap is positioned in the exhaust system of a vehicle downstream from a close-coupled catalyst such that the exhaust temperature at the catalyst location does not exceed 850° C. during normal vehicle operation and when combined with a hydrocarbon adsorption material in a trap, the exhaust temperature does not exceed 700° C.

7 Claims, 6 Drawing Sheets

(51) Int. Cl.
*B01J 23/00* (2006.01)
*B01J 23/02* (2006.01)
*B01J 23/10* (2006.01)
*B01J 23/42* (2006.01)
*B01J 23/44* (2006.01)
*B01J 23/56* (2006.01)
*B01J 23/58* (2006.01)
*B01D 50/00* (2006.01)
*B01J 35/04* (2006.01)
*B01J 29/068* (2006.01)
*B01J 23/63* (2006.01)
*B01D 53/94* (2006.01)
*B01J 37/02* (2006.01)
*B01J 29/44* (2006.01)
*B01J 29/74* (2006.01)

(56) References Cited

U.S. PATENT DOCUMENTS

| | | | |
|---|---|---|---|
| 6,634,169 B1 | 10/2003 | Andersen et al. | |
| 6,651,424 B1 | 11/2003 | Twigg | |
| 7,374,729 B2 | 5/2008 | Chen et al. | |
| 8,246,923 B2 * | 8/2012 | Southward et al. | 423/213.5 |
| 8,475,752 B2 | 7/2013 | Wan | |
| 8,479,493 B2 | 7/2013 | Kim et al. | |
| 8,679,411 B2 * | 3/2014 | Akamine et al. | 422/171 |
| 2002/0131914 A1 * | 9/2002 | Sung | 422/177 |
| 2007/0238605 A1 | 10/2007 | Strehlau et al. | |
| 2011/0305612 A1 | 12/2011 | Muller-Stach et al. | |
| 2012/0216508 A1 | 8/2012 | Collins et al. | |
| 2012/0247088 A1 | 10/2012 | Beall et al. | |

OTHER PUBLICATIONS

Cuif et al., "(Ce, Zr)O2 Solid Solutions for Three-Way Catalysts", SAE Technical Paper Series, The Engineering Society for Advancing Mobility Land Sea Air and Space, International Congress & Exposition, Detroit, Michigan, Feb. 24-27, 1997.

Rohart et al., "Innovative Materials with High Stability, High OSC, and Low Light-Off for Low PGM Technology", SAE Technical Paper 2004-01-1274, 2004, doi:10.4271/2004-01-1274, Mar. 8, 2004.

Sharpe et al., "Developing a World Class Technology Pathways Program in China", The International Council of Clean Transportation, White Paper No. 14, Sep. 2011.

* cited by examiner

LOW TEMPERATURE CATALYST/HYDROCARBON TRAP

BACKGROUND OF THE INVENTION

Embodiments described herein relate to a catalyst for cold-start engine emissions which contains oxygen storage materials to provide a source of oxygen for hydrocarbon combustion at low temperatures. More particularly, embodiments described herein relate to a hydrocarbon trap including the catalyst.

In recent years, considerable efforts have been made to reduce the level of carbon monoxide (CO), hydrocarbon (HC), and nitrogen oxide ($NO_x$) emissions from vehicle engines. Conventional exhaust treatment systems typically include a three-way catalyst (TWC) to reduce these pollutants and prevent the exit of unburnt or partially burnt hydrocarbon emissions from the vehicle exhaust. However, during initial starting of the engine, the three-way catalysts are not sufficiently hot to become catalytically active, i.e., they have not reached their "light-off" temperature. As a result, pollutants may pass through the engine exhaust system without being treated.

Hydrocarbon traps have been developed for reducing emissions during cold-starting by trapping/adsorbing hydrocarbon (HC) emissions at low temperatures and releasing/desorbing them from the trap at sufficiently elevated temperatures (i.e., at or above the light-off temperature) for treatment by a three-way catalyst for conversion to $CO_2$ and water. The three-way catalyst may be located downstream from the trap or it may be combined with the trap adsorbent material, for example, by providing a TWC washcoat layer over the HC adsorbent material (referred to as a catalyzed hydrocarbon trap) where both the TWC and HC adsorbent material are deposited on a monolithic carrier. Typically, a catalyzed hydrocarbon trap comprises a three-way catalyst material with an adsorbent material such as zeolite that traps the hydrocarbons during cold-starting.

In operation, the exhaust flow is then routed across the hydrocarbon trap such that HC species adsorb on the trap. Upon desorption from the trap, the hydrocarbons contact the three-way catalyst for conversion to $CO_2$ and $H_2O$ as the trap and catalyst heat up.

One of the greatest challenges with the use of such hydrocarbon traps in an exhaust system is to retain the adsorbed hydrocarbons until the three-way catalyst is hot enough to efficiently convert the HC when desorbed from the trap. This is typically facilitated by combining the HC trapping material (such as zeolite) and catalyst into a single body such as a monolith honeycomb. However, it is still possible for some HC species to desorb from the trap below 200° C., which is below the light-off temperature of a typical three-way catalyst formulation. In addition, conventional exhaust gas systems typically include an upstream TWC catalyst which is close-coupled to the exhaust manifold, and thus warms up more quickly than the downstream HC trap. Hence, oxygen is significantly depleted from the exhaust stream by oxidation reactions occurring over the close-coupled TWC catalyst, so there is often insufficient oxygen left to react with the released HC from the trap to form $CO_2$ and $H_2O$. This can cause HC to slip out of the trap untreated, resulting in low HC conversion.

These problems increase with the aging of the trap. For example, high temperature aging during vehicle operation causes stored hydrocarbons to desorb at lower temperatures and requires higher temperatures to achieve oxidation of the released hydrocarbons. While lower operating temperatures have been achieved by placing the a hydrocarbon trap in the underbody converter assembly of the vehicle, exhaust gas oxygen required to enable conversion of trapped HC to $CO_2$ and $H_2O$ is limited in this location.

Further, typical temperatures of gasoline exhaust gases upstream of close-coupled catalysts are generally over 800° C. Thus, the materials used as hydrocarbon absorbents must have high temperature stability. While gamma alumina and zeolites have been used in conventional hydrocarbon traps, they tend to lose adsorption capability at such high temperatures.

Accordingly, it would be desirable to provide an improved catalyst and source of oxygen which achieves oxidation of hydrocarbons at low temperatures, and to provide a catalyst/hydrocarbon trap which maintains good hydrocarbon adsorption capability and catalyst conversion over the useful life of the vehicle.

SUMMARY OF THE INVENTION

Those needs are met by embodiments of the invention which provide a catalyst/hydrocarbon trap for reduction of cold-start vehicle emissions of gasoline and diesel engines or engines using bio-fuels. The catalyst/hydrocarbon trap includes an oxygen storage capacity (OSC) material therein to provide sufficient oxygen to achieve oxidation of hydrocarbons and carbon monoxide (CO) at low temperatures. The catalyst/hydrocarbon trap is positioned in a vehicle exhaust system such that the exhaust temperatures are maintained at a temperature below 850° C., and preferably, below 700° C. during normal vehicle operation to maintain good hydrocarbon adsorption capability for the full useful life of the exhaust system.

According to one aspect of the invention, a low temperature catalyst is provided which comprises a platinum group metal impregnated onto an oxygen storage material and calcined to bond the platinum group metal to the oxygen storage material. By "low temperature" catalyst, it is meant that the catalyst begins to oxidize hydrocarbons at a temperature below about 200° C. Preferably, the catalyst begins to oxidize carbon monoxide at a temperature less than about 150° C., and more preferably, less than about 100° C.

The catalyst comprising the bonded platinum group metal and oxygen storage material may be contained on a support structure selected from the group consisting of cordierite, extruded zeolite, silicon carbide, and metallic foil. The support structure may also comprise a support including a previously applied washcoat such as a three-way catalyst and/or zeolite. The catalyst is adapted to be positioned in the exhaust stream of a vehicle downstream of a close-coupled catalyst such that the temperature of the exhaust gas stream, when in contact with the catalyst, does not exceed 850° C. during normal vehicle operation. By "close-coupled catalyst," it is meant a catalyst which is mounted immediately after the exhaust manifold. The close-coupled catalyst may comprise a conventional three-way catalyst, and is configured for substantially simultaneous removal of carbon monoxide, hydrocarbons, and nitrogen oxides.

According to another aspect of the invention, a hydrocarbon trap is provided which contains a low temperature catalyst comprising a platinum group metal impregnated onto an oxygen storage material and calcined to bond the platinum group metal to the oxygen storage material, where the catalyst is contained on a support structure selected from the group consisting of a zeolite, an extruded zeolite, and a cordierite whose walls are coated with a zeolite. The trap is adapted to be positioned in the exhaust system of a vehicle downstream of a close-coupled catalyst. In one embodiment, the temperature of the exhaust gas stream, when in contact with the trap, does not exceed 700° C. during normal vehicle operation.

The oxygen storage material used in the catalyst/hydrocarbon trap is selected from cerium oxide, zirconium oxide, and mixtures thereof. Such mixtures are commonly referred to as mixed oxides or solid solutions in that they retain the fluorite structure of $CeO_2$, but with partial substitution of Zr cations for Ce cations in the structure. Preferably, the oxygen storage material comprises a mixture of cerium oxide and zirconium oxide, where the mixture comprises at least 50% by weight cerium oxide (ceria). In another embodiment, the mixture comprises at least 75% by weight ceria. Hereinafter such materials are described as cerium-zirconium or CZO.

Where the support structure is a zeolite, the zeolite is selected from beta zeolite, ZSM-5, or a combination thereof. The beta-zeolite preferably has an $SiAl_2$ ratio of about 40 to 100.

The platinum group metal is selected from palladium, platinum, and rhodium. In one embodiment, the platinum group metal comprises palladium. In one embodiment, the platinum group metal loading is less than or equal to about 100 g/ft$^3$ where the volume measurement is based on external dimensions of the monolithic carrier.

According to another aspect of the invention, a method for reducing cold start hydrocarbon emissions from a vehicle engine is provided in which the low-temperature catalyst/hydrocarbon trap is positioned in the exhaust passage of a vehicle downstream from a close-coupled catalyst and exhaust gases are passed through the catalyst/trap. In one embodiment, the temperature of the exhaust gas stream, when in contact with the trap, does not exceed 700° C. during normal vehicle operation. Preferably, the temperature of the exhaust gas stream is at least 400° C. during normal vehicle operation. As exhaust gases are passed through the exhaust passage, the trap adsorbs unburned hydrocarbon emissions in the exhaust and retains the hydrocarbons until sufficient temperatures are reached for catalytic conversion, i.e., from about 200° C. to about 600° C. At least a portion of unburnt hydrocarbons and/or carbon monoxide which are not absorbed in the trap during cold-start are oxidized by the low-temperature catalyst at a temperature less than about 200° C.

Accordingly, it is a feature of embodiments of the invention to provide a catalyst/hydrocarbon trap for reducing cold-start vehicle exhaust emissions at low temperatures. Other features and advantages of the invention will be apparent from the following description, the accompanying drawings, and the appended claims.

DETAILED DESCRIPTION

Embodiments of the low-temperature catalyst and hydrocarbon trap described herein utilize a platinum group metal which is impregnated onto an oxygen storage material. We have found that by including an oxygen storage material which includes high amounts of ceria with the catalyst, unburned hydrocarbon emissions in the exhaust gas stream of a vehicle may be oxidized at temperatures of less than about 200° C., while carbon monoxide may be oxidized at temperatures of less than about 100° C.

Where the catalyst formulation is used as a stand-alone catalyst, it is positioned in the underbody location of an exhaust system so that the temperature of the exhaust gas stream when it encounters the catalyst is less than about 850° C. during normal vehicle operation. Where the catalyst is incorporated in a hydrocarbon trap containing an adsorbent material (zeolite), the trap is positioned in an area of the exhaust system where the exhaust gas temperatures are below about 700° C. during normal vehicle operation, which minimizes thermal deterioration of the hydrocarbon adsorption material and improves its useful life. Normal vehicle operation is defined as temperatures measured at the specified location during standard driving cycles such as the FTP, HWFET, and US06 cycles defined by government regulatory agencies and linked to emissions and fuel economy standards.

The catalyst formulation provides superior low temperature oxidation capability over the use of conventional TWC or oxidation catalysts which typically comprise platinum group metals on an alumina support and which are designed for aging temperatures of about 1000° C. In contrast, embodiments of the low temperature catalyst formulation of the present invention utilize platinum group metals which are highly dispersed on ceria-based oxygen storage materials which are stable up to 850° C. and are adapted for use under exhaust conditions which rarely exceed 850° C. We have found that such oxygen storage materials exhibit high oxidation activity at low temperatures, especially in an exhaust stream which is significantly oxygen depleted. Without wishing to be bound by theory, during initial engine operation, oxygen is transferred from the OSC materials to the PGM particles such that oxygen reacts with the HC molecules adsorbed on the PGM particles, thus converting the HC molecules to $CO_2$ and $H_2O$.

Alternatively, (or in addition to the above reaction), carbon monoxide reacts with the oxygen from the oxygen storage material, thereby decreasing its competition with the HC molecules for the limited amount of gaseous oxygen in the exhaust stream, and thus, indirectly promoting conversion of the HC molecules to $CO_2$ and $H_2O$. These processes deplete the OSC material of oxygen, but the oxygen content is restored once the catalyst/hydrocarbon trap warms up to its normal operating temperature, which occurs under fuellean combustion conditions, deceleration fuel shut-off, or pumping air through the engine and exhaust system following engine shut-off.

We have also found that by utilizing platinum group metals which are impregnated onto cerium zirconium oxide (CZO) OSC materials which are rich in cerium, increased total oxygen capacity is obtained over the use of zirconia rich CZO materials which are typically used in conventional TWC catalysts. In addition, we have found that because the platinum group metal is impregnated onto the oxygen storage material, when it is combined with a zeolite support, the platinum group metal does not migrate. Because the PGM impregnated CZO material can use oxygen from the CZO, low temperature oxidation is easily achieved. This is in contrast to a conventional TWC catalyst in which the PGM is typically distributed between CZO and alumina support materials. As alumina is a non-reducible support material, the PGM associated with the alumina has no source of oxygen to draw from for low temperature oxidation, leading to reduced catalyst activity.

However, it should be appreciated that it is possible to use the catalyst formulation described herein in combination with a conventional three-way catalyst. For example, the catalyst comprising a PGM impregnated onto an oxygen storage material may be combined with a three-way catalyst comprising a PGM on alumina with an oxygen storage material. Such a combination would provide efficient conversion at low and high temperatures in an underbody location of the vehicle, either with or without the inclusion of hydrocarbon trapping materials.

Unless otherwise indicated, the disclosure of any ranges in the specification and claims are to be understood as including the range itself and also any values subsumed therein, as well as endpoints.

Suitable platinum group metals (PGM) for use in the catalyst/hydrocarbon trap include platinum, palladium, and rhodium. Palladium is preferred for use and may comprise up to 100% by weight of the platinum group metal. However, it should be appreciated that it is possible to use combinations of platinum group metals and support materials in a washcoat to promote HC conversion as well as the full range of three-way catalyst functions.

Preferably, the PGM loading in the catalyst/trap should be between about 0.5 wt % to about 2 wt % of the washcoat, and more preferably, from about 0.5 wt % to about 1.5 wt %. At a PGM loading of about 1.5 wt %, we obtain greater than 50 wt % HC conversion and greater than 50 wt % CO conversion to $CO_2$ at low temperatures of from about 150 to 200° C. Greater loading is possible, but results in increased costs. It should be appreciated that the amount of PGM washcoat applied may vary in order to achieve the desired level of loading.

Suitable oxygen storage materials include solid solutions of cerium and zirconium oxides. The oxygen storage material preferably comprises from about 50% to 100% by weight ceria, and more preferably, about 75% by weight.

The catalyst is preferably prepared by impregnating the platinum group metal onto the oxygen storage material followed by calcining at a temperature of about 500° C. or higher in air. The catalyst may be provided on a cordierite substrate by washcoating with a binder material such as alumina and used in this form as a stand-alone catalyst positioned in an exhaust stream.

Alternatively, the catalyst may be applied as a washcoat to a zeolite support structure for use as a hydrocarbon trap. Where the catalyst is applied as a washcoat to a zeolite support, the catalyst is mixed with a binder material such as alumina or other binder materials well known in the art. The washcoat is then applied to the zeolite. The zeolite may be provided in the form of a calcined washcoat slurry of particles and binder that is coated on the walls of a monolith support, extruded into a monolith support, or coated inside and on the walls of a highly porous monolith support. Preferred zeolite materials for use include beta-zeolite, ZSM-5 zeolite, or a combination thereof. The zeolite preferably has a $Si/Al_2$ ratio of from about 40 to 100.

Where the zeolite is in extruded form, the catalyst material (containing the calcined platinum group metal/OSC material), zeolite material and a binder may be extruded in the form of a slurry containing from about 40 to 80% by weight zeolite through an extrusion die which is configured so as to produce a monolith having an open frontal area (OFA) of about 40 to 70%. By "open frontal area," it is meant the part of the total substrate cross-sectional area which is available for the flow of gas. The OFA is expressed as a percentage of the total substrate cross-section or substrate void fraction.

Where the catalyst is to be applied as a washcoat to a zeolite, the catalyst material is mixed with a binder and then applied to the zeolite. Alternatively, the catalyst may be combined with a zeolite and/or a binder and then coated onto a support comprising cordierite. Suitable binders for use in the washcoat include alumina, and other binder materials known in the art.

Figure 1:
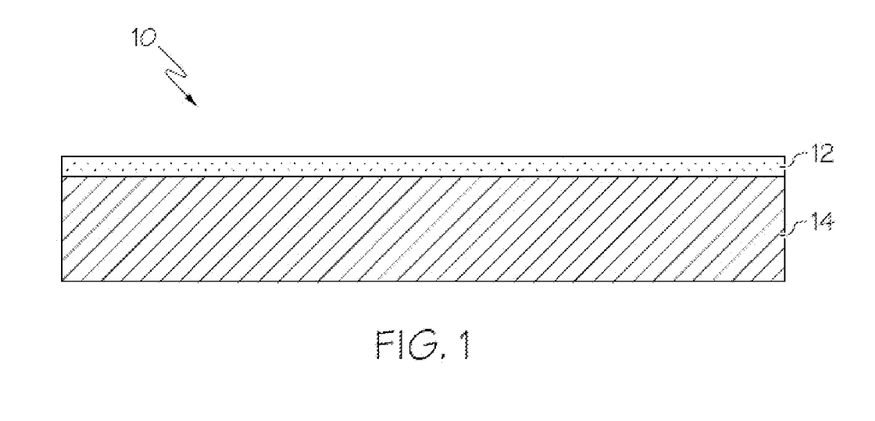
FIG. 1 is a schematic illustration of a low-temperature catalyst on a support in accordance with an embodiment of the invention.

Referring now to FIG. 1, a low-temperature catalyst 10 is illustrated which includes a catalyst material 12 containing a calcined platinum group metal and OSC material. As shown, the catalyst material 12 is preferably positioned on a support 14 which may comprise a zeolite material or a cordierite material.

Figure 2:
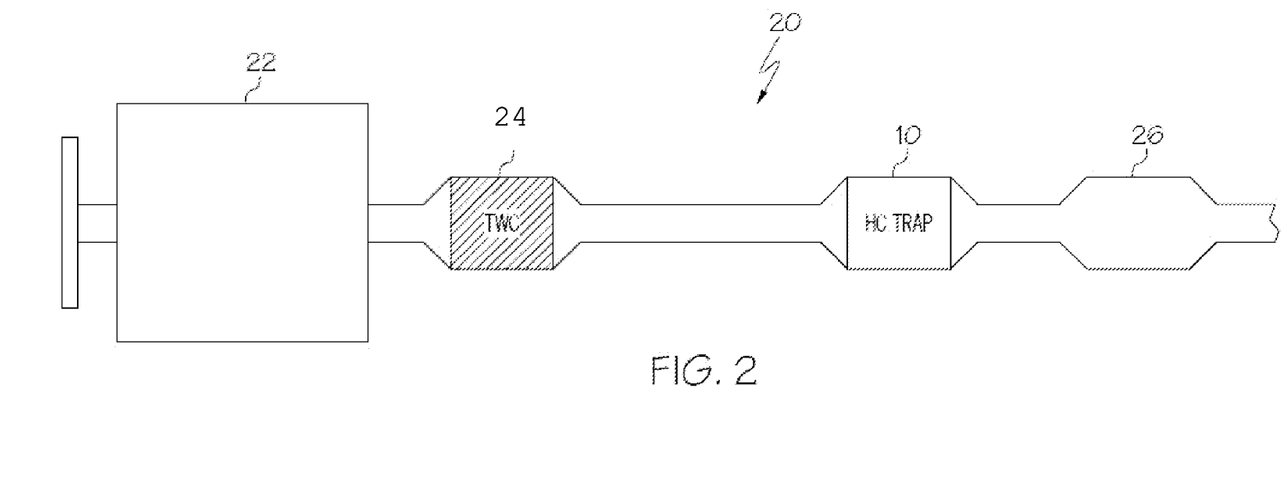
FIG. 2 is a schematic illustration of an exhaust treatment system including a catalyst/hydrocarbon trap in accordance with an embodiment of the invention.

Referring now to FIG. 2, an exhaust system 20 for a motor vehicle is illustrated which includes the catalyst/hydrocarbon trap 10 positioned in an underbody location of the vehicle. As shown, the exhaust treatment system is coupled to an exhaust manifold 22 of an engine (not shown). The exhaust further includes a close-coupled catalyst 24 which is positioned upstream from the catalyst/hydrocarbon trap, and a resonator or muffler 26 positioned downstream from the trap. The catalyst may be positioned at the resonator inlet or further upstream of the inlet. While the figure illustrates a preferred positioning of the catalyst/hydrocarbon trap, it should be appreciated that the specific positioning may vary depending on the particular vehicle in which the catalyst/trap is installed. Where the catalyst is positioned as a stand-alone catalyst in the exhaust system, it is preferably positioned in a typical underbody location or as far back as the front muffler location which is in front of the rear axle (not shown).

In embodiments where the catalyst is included in a hydrocarbon trap, the trap is preferably mounted in the vehicle exhaust in a position where it will be maintained at a temperature of below 700° C. during hghway driving conditions of about 55 to 80 mph. This prevents deterioration of the materials comprising the trap.

In embodiments where the catalyst is used as a stand-alone catalyst (without any zeolite), the catalyst is preferably mounted such that the vehicle exhaust is maintained at a temperature below 850° C. during normal vehicle operations.

During operation, as exhaust gas generated by the engine passes through the catalyst/hydrocarbon trap 10, the cold-start emissions of hydrocarbons are adsorbed and stored in the trap while the engine/catalyst is cold. The emissions are retained in the trap until the engine and exhaust gas reach sufficiently elevated temperatures to heat the trap and cause significant desorption at temperatures from about 100° C. up to about 400° C. The hydrocarbons are then desorbed and oxidzed to CO or $CO_2$ by the catalyst materials in the hydrocarbon trap 10 starting at a temperature below about 200° C. This provides a significant advantage over the use of conventional three-way catalyst materials, in which desorption and oxidation occurs at temperatures of about 200° C. and above.

In order to ensure the removal of cold-start hydrocarbons stored in the adsorption material (zeolite), the vehicle exhaust should be maintained at a temperature of at least 400° C. during driving conditions of about 35 to 50 mph. We have found that the hydrocarbon trap may be mounted in the exhaust system in a position which achieves these optimal temperature conditions without the use of special bypass loops or exhaust valves.

We have found that upon depletion of oxygen, the catalyst formulation with the best low temperature CO and HC oxidation contains greater than 0.50 wt % Pd on an OSC material containing greater than 50 wt % ceria. While not wishing to be bound by theory, it is believed that the combination of palladium on $CeO_2$ can directly and quickly obtain oxygen from $CeO_2$ and oxidize CO and HC at very low temperatures (i.e. about 100° C.).

In order that the invention may be more readily understood, reference is made to the following examples, which are intended to illustrate the invention, but are not to be taken as limiting the scope thereof.

Example 1

Figure 3:
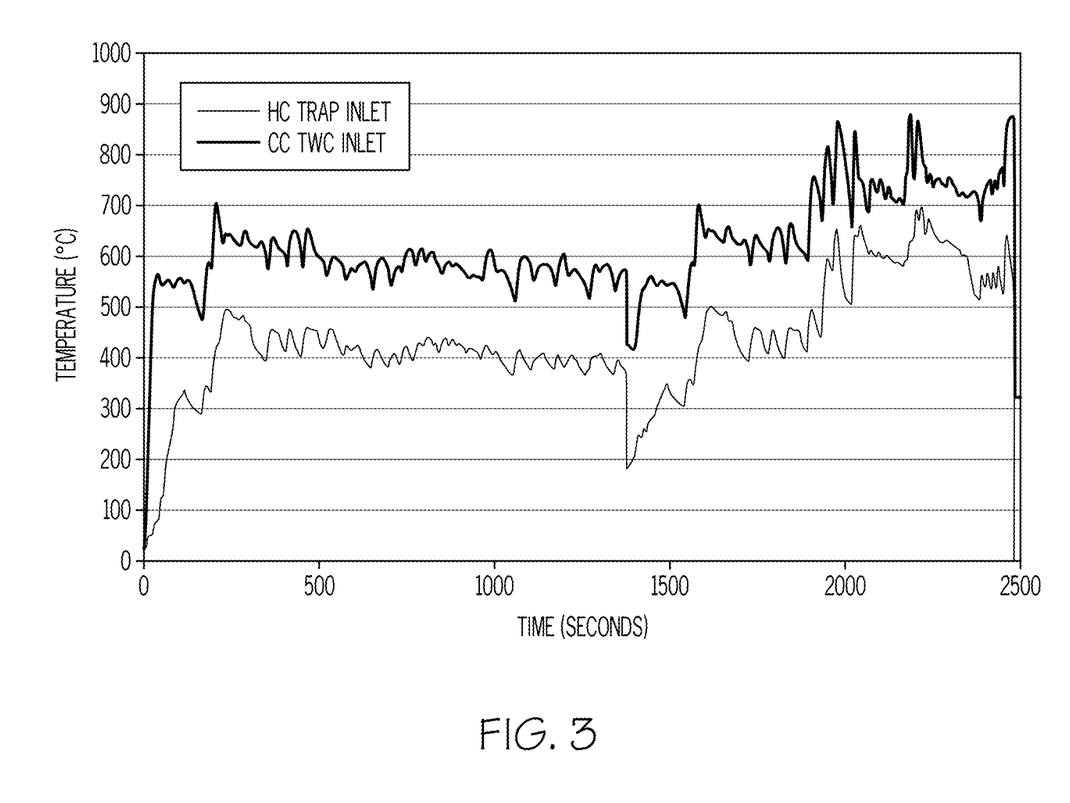
FIG. 3 is a graph illustrating exhaust temperatures of a vehicle including a close-coupled catalyst and a catalyzed hydrocarbon trap during combined FTP and US06 test cycles in which the temperature does not exceed 700° C.

The emissions from two conventional TWC catalysts and two underbody hydrocarbon traps were measured from the exhaust of a 2.0 liter Ford Focus vehicle during combined FTP and US06 drive cycles, run on a chassis-roll dynamometer. The hydrocarbon traps were positioned approximately 40 inches downstream from a close-coupled three-way catalyst and approximately 57 inches from the exhaust manifold header flange. The FTP (Federal test procedure) drive cycle is used to determine whether a catalyst system can meet regulated emissions standards on a specific vehicle. The US06 drive cycle is a test cycle that is used to represent highway driving where the vehicle operates at higher speed and load conditions than what may be typical of less aggressive drive cycles. FIG. 3 illustrates the exhaust temperatures measured on the vehicle at the close-coupled TWC and underbody HC trap locations during the combined test cycles. As can be seen, due to positioning of the traps, the temperature of the HC trap inlet did not exceed 700° C. during testing.

Example 2

A catalyst formulation was prepared in accordance with an embodiment of the invention. About 1.5 wt % palladium was dispersed on a CZO support at a weight ratio of 75:25. The catalyst was subjected to laboratory tests in comparison with a conventional catalyzed hydrocarbon trap which was prepared by coating a cordierite monolith support with a zeolite slurry, followed by a heat treatment, coating with a TWC slurry, followed by calcination, then coated with a TWC catalyst and heat treated, and then impregnated with a PGM solution. The HC trap further included a CZO material containing greater than 60% by weight zirconia. The conventional HC trap was designed for aging conditions up to 1000° C. which would typically be encountered in an engine under normal aging conditions.

The aging conditions for both samples consisted of a 4-mode cycle where the sample midbed temperature was an effective (weighted average) of 760° C. (range of 740° C. to 840° C.) for 50 hours in sulfur-free iso-octane combustion gas. The approximate gas composition during aging was about 400-800 ppm HC, about 600-1000 ppm NOx, about 2000-18,000 ppm CO, about 0-10,000 ppm $O_2$, and about 10% water and nitrogen. These amounts varied according to the combustion air/fuel ratio that cycled between lambda of about 0.91 and 1.00.

Figure 4:
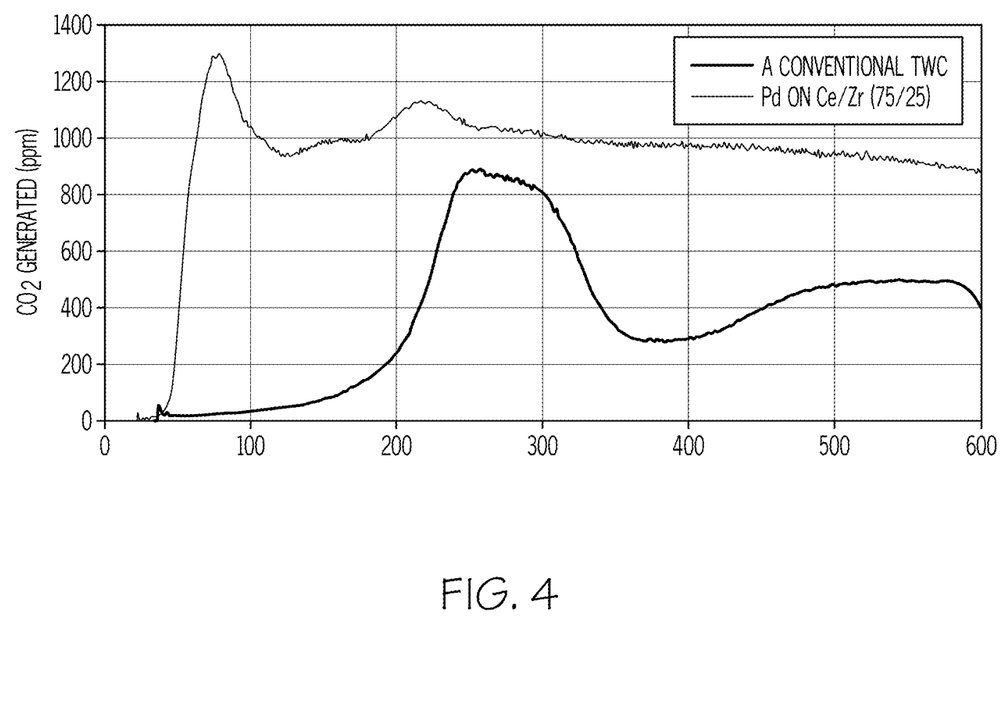
FIG. 4 is a graph illustrating CO oxidation of a conventional hydrocarbon trap in comparison with a hydrocarbon trap containing the catalyst formulation of an embodiment of the invention.

FIG. 4 illustrates the oxidation of CO ($CO_2$ generation) versus temperature for the two catalysts. No hydrocarbons or $O_2$ were included in the gas mixture. As can be seen, the low temperature CO oxidation activity of the conventional HC trap is significantly less than that of the catalyst formulation utilizing the CZO (75:25 ratio) oxygen storage material. It was also noted that because the testing was carried out in the absence of $O_2$ and $H_2O$, the only source of oxygen was from the oxygen stored in the OSC materials.

Example 3

A catalyst formulation was prepared as in Example 2 including palladium on a CZO support including zeolite (hydrocarbon trap). The trap was positioned downstream from a bed of beta zeolite having an $Si/Al_2$ ratio of 25 (Zeolyst CP814E). The trap was evaluated for desorption of ethanol in comparison with a conventional hydrocarbon trap including a catalyst and CZO material as described in Example 2. The samples were subjected to a feed containing ethanol at 900 ppm for 30 seconds, followed by removal of ethanol from the feed. The samples were then heated and tested for outlet emissions as a function of outlet temperature.

Figure 5:
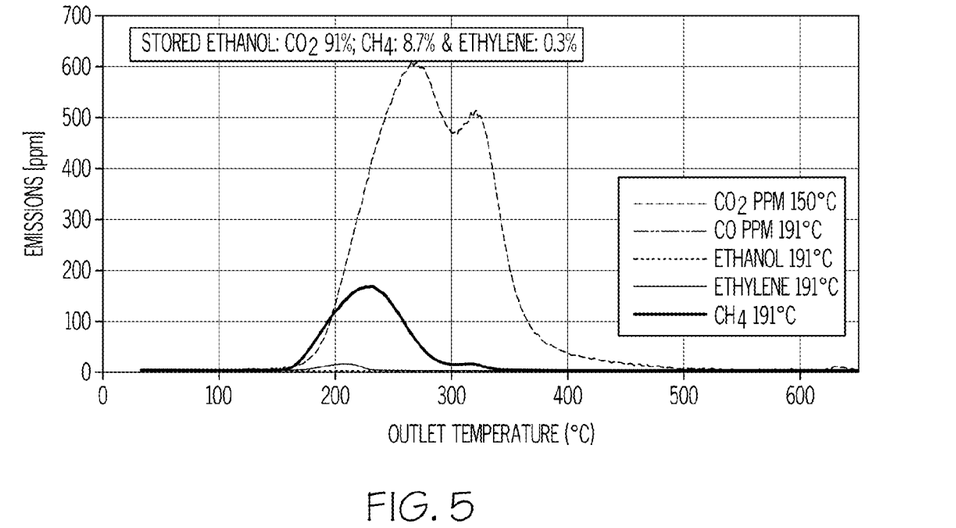
FIG. 5 is a graph illustrating desorption of ethanol from a hydrocarbon trap prepared in accordance with an embodiment of the invention.

As can be seen, ethanol desorption occurred at temperatures between 100° C. to 350° C. during warm-up of the catalyst. As shown in FIG. 5, the hydrocarbon trap comprising palladium on the CZO material oxidized more than 90% of the stored ethanol to $CO_2$ and 8% to $CH_4$ with almost no unconverted ethanol slipping out.

Figure 6:
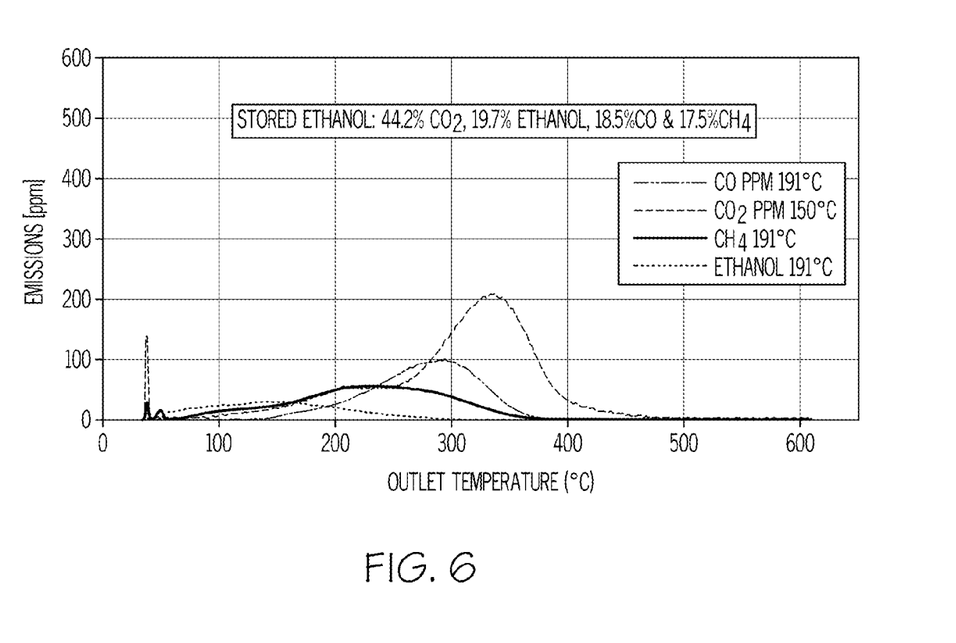
FIG. 6 is a graph illustrating desorption of ethanol from a conventional hydrocarbon trap.

As shown in FIG. 6, in the conventional HC trap, about 20% of the stored ethanol slipped out unconverted and about 44% of the stored ethanol was oxidized to $CO_2$, 18% was oxidized to CO, and 71.5% was oxidized to $CH_4$.

Example 4

Catalyst formulations were prepared in accordance with an embodiment of the invention. Varying amounts of palladium (1.5 wt %, 0.35%, and 0.7%) were dispersed on CZO supports containing the same amount of oxygen storage material. The catalysts were then subjected to laboratory tests and compared to a conventional catalyzed hydrocarbon trap containing 1.5 wt % palladium. All of the catalysts were aged at 750° C. under a 4-mode cycle condition.

Figure 7:
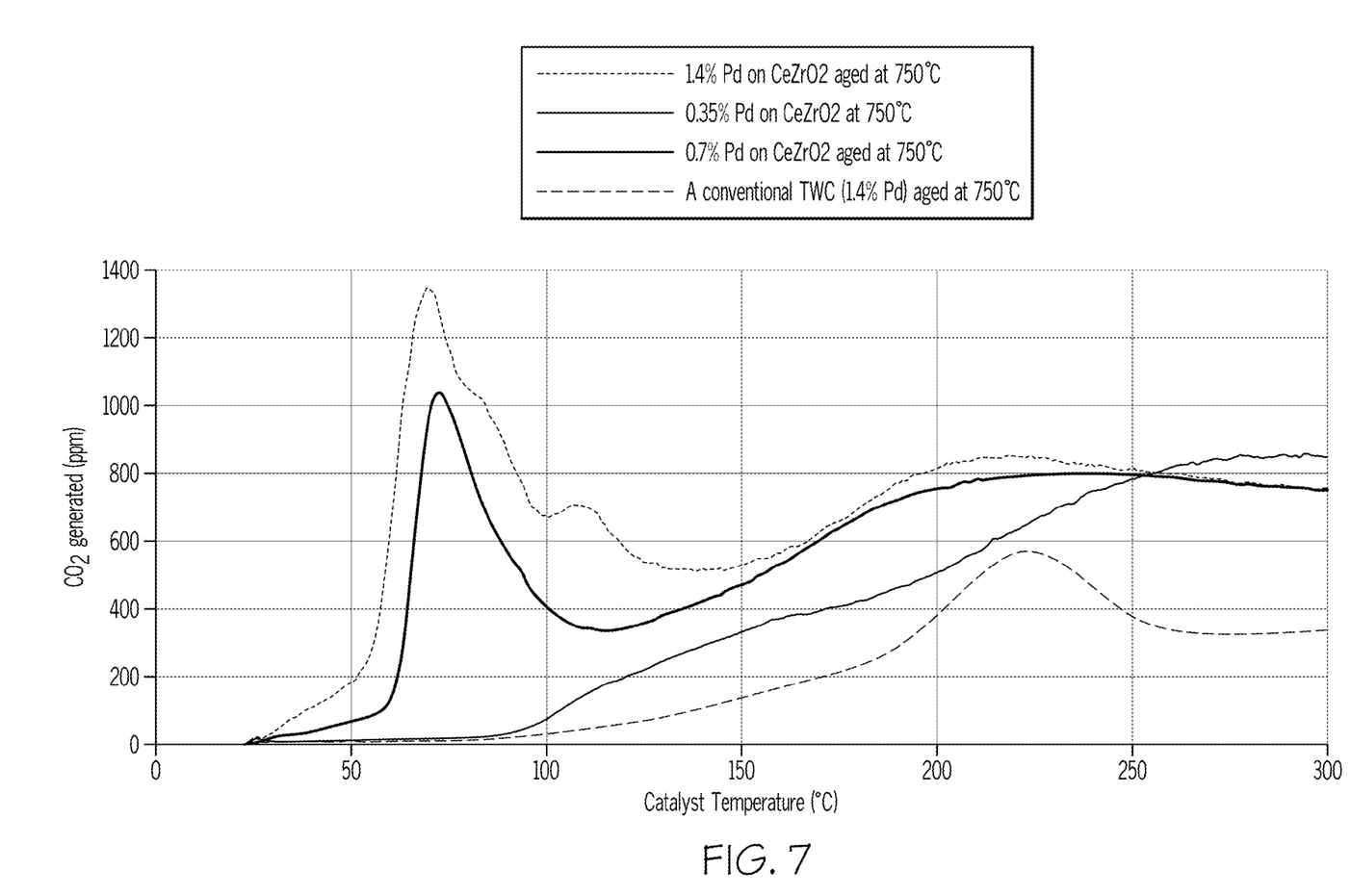
FIG. 7 is a graph illustrating the conversion of CO to $CO_2$ using catalyst formulations of embodiments of the invention as compared to with a conventional three-way catalyst.

The catalysts were tested using a pre-lean treatment of 1200 ppm $O_2$ at 650° C. for 10 minutes, followed by cooling to room temperature. Each test started at room temperature with a constant CO concentration of 1000 ppm in the feed gas. The catalysts were heated up to 650° C. at a heating rate of 60° C./min. There was no $O_2$ present in the feed gas; thus CO was oxidized only by stored $O_2$ in the catalysts. FIG. 7 illustrates that the use of palladium impregnated in the oxygen storage material results in better low temperature oxidation activity in comparison with a conventional catalyst, especially at amounts of 0.7 wt % Pd and above. In contrast, the conventional catalyst including 1.5 wt % Pd loading exhibited poor oxidation of CO at low temperatures (less than 150° C.).

Example 5

Figure 8:
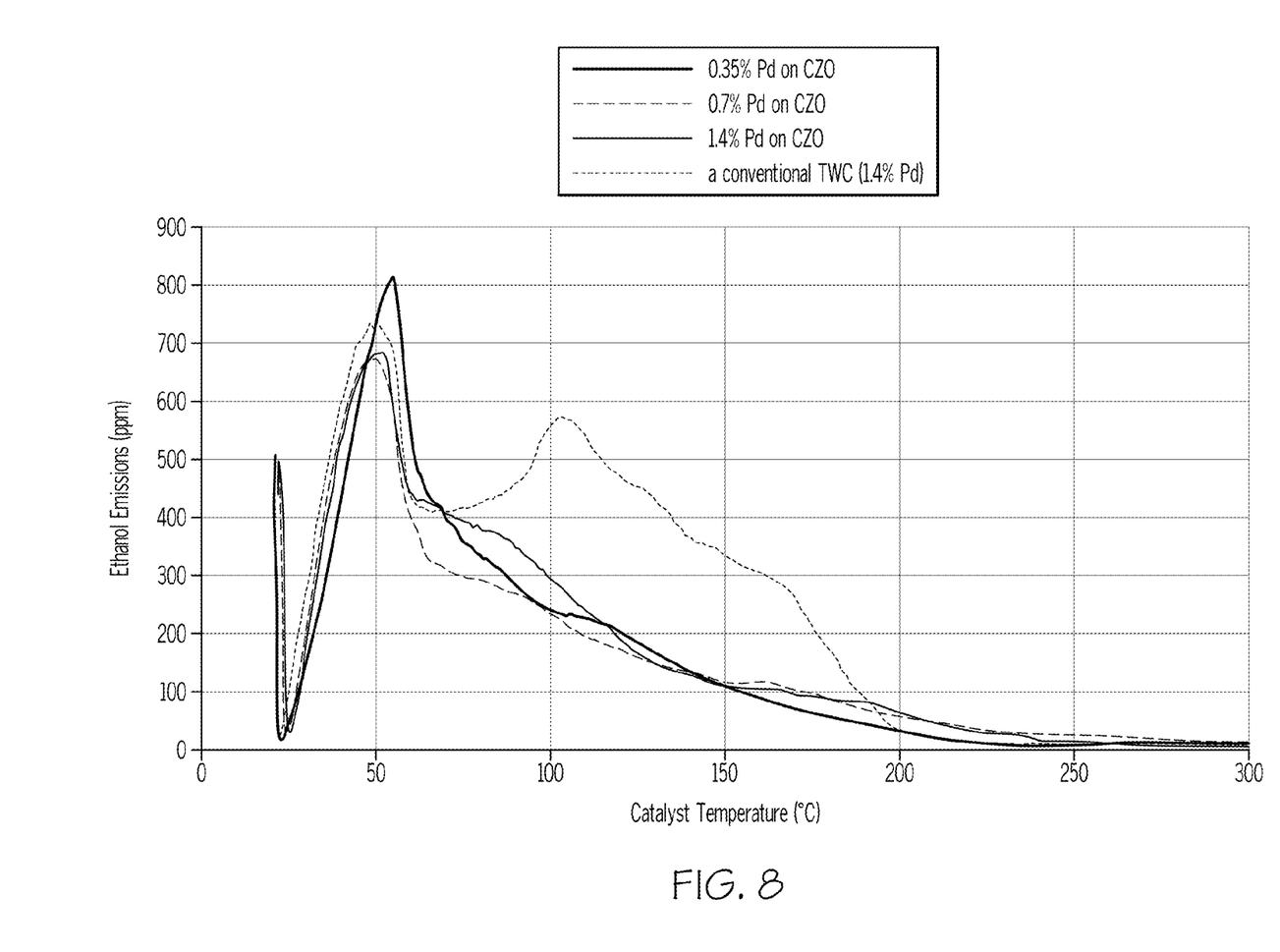
FIG. 8 is a graph illustrating ethanol emissions for catalyst formulations of embodiments of the invention as compared to a conventional three-way catalyst.

Catalyst formulations as described in Example 4 were prepared in accordance with an embodiment of the invention. Varying amounts of palladium (1.4 wt %, 0.35%, and 0.7%) were dispersed on CZO supports containing the same amount of oxygen storage material. The catalysts were then subjected to laboratory tests in comparison with a conventional catalyzed hydrocarbon trap containing 1.4 wt % palladium. All of the catalysts were aged at 750° C. under a 4-mode cycle. These catalysts were tested under conditions which included a feedgas containing 450 ppm ethanol, 300 ppm CO, 1500 ppm $O_2$, and 10% $H_2O$. The catalysts were also subjected to a pre-lean treatment of 1200 ppm $O_2$ for 10 minutes at 600° C. The catalysts were heated from 30° C. up to 600° C. at a heating rate of 60° C./min. FIG. 8 illustrates that the use of palladium on the oxygen storage material results in better low temperature oxidation activity of ethanol in comparison with a conventional catalyst. In contrast, the conventional catalyst including 1.4 wt % Pd loading exhibited poor oxidation of ethanol at low temperatures.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention

What is claimed is:

1. An exhaust treatment system comprising:
    a close-coupled catalyst comprising a three-way catalyst;
    a low temperature catalyst positioned in an underbody of a vehicle and downstream from said close-coupled catalyst, said low temperature catalyst comprising a platinum group metal impregnated onto an oxygen storage material, the oxygen storage material comprising cerium and zirconium oxides with at least 50% cerium oxide by weight, and the oxygen storage material calcined to bond to said platinum group metal, said low temperature catalyst forming a washcoat on a support structure comprising cordierite; and
    wherein the underbody position of said low temperature catalyst is such that an exhaust gas temperature from a vehicle engine does not exceed 850° C. during normal vehicle operation at the underbody position.

2. The exhaust treatment system of claim 1, wherein the cerium and zirconium oxides of the oxygen storage material are in a solid solution.

3. The exhaust treatment system of claim 1, wherein the oxygen storage material comprising cerium and zirconium oxides comprises 75% cerium oxide by weight.

4. An exhaust treatment system comprising:
    a close-coupled catalyst comprising a three-way catalyst;
    a hydrocarbon trap positioned downstream from said close-coupled catalyst in an underbody of a vehicle, said hydrocarbon trap comprising a catalyst comprising a platinum group metal impregnated onto an oxygen storage material, the oxygen storage material comprising cerium and zirconium oxides with at least 50% cerium oxide by weight, and the oxygen storage material calcined to bond to said platinum group metal, said catalyst forming a washcoat on a support structure selected from a group consisting of a zeolite, an extruded zeolite, and a porous cordierite whose walls are coated with a zeolite, and wherein the underbody position of the hydrocarbon trap is such that an exhaust gas temperature from a vehicle engine does not exceed 700° C. during normal vehicle operation at the underbody position.

5. The exhaust treatment system of claim 4, wherein the cerium and zirconium oxides of the oxygen storage material are in a solid solution.

6. The exhaust treatment system of claim 4, wherein the oxygen storage material comprising cerium and zirconium oxides comprises 75% cerium oxide by weight.

7. The exhaust treatment system of claim 4, wherein the zeolite is selected from beta zeolite, ZSM-5, or a combination thereof.

* * * * *